United States Patent [19]

Tabata et al.

[11] 4,401,983
[45] Aug. 30, 1983

[54] ELECTROCHROMIC DISPLAY DEVICE EXHIBITING UNIFORM COLORATION DENSITY

[75] Inventors: Junichi Tabata; Noboru Kaneko, both of Tokyo, Japan

[73] Assignee: Kabushiki Kaisha Daini Seikosha, Tokyo, Japan

[21] Appl. No.: 165,501

[22] Filed: Jul. 3, 1980

[30] Foreign Application Priority Data

Jul. 4, 1979 [JP] Japan .................................. 54-084858

[51] Int. Cl.³ .............................................. G09G 3/34
[52] U.S. Cl. .................................... 340/785; 340/713; 340/763; 340/811; 350/357; 358/239
[58] Field of Search ............... 340/713, 785, 783, 763, 340/811; 350/357, 363; 358/239, 240

[56] References Cited

U.S. PATENT DOCUMENTS

| | | | |
|---|---|---|---|
| 3,972,040 | 7/1976 | Hilsum et al. ....................... | 340/785 |
| 4,092,637 | 5/1978 | Barclay et al. ....................... | 340/763 |
| 4,210,907 | 7/1980 | Hamada et al. ..................... | 340/785 |
| 4,210,909 | 7/1980 | Hamada et al. ..................... | 340/785 |
| 4,228,431 | 10/1980 | Barclay et al. ....................... | 340/785 |
| 4,242,681 | 12/1980 | Tabata ................................ | 340/785 |

*Primary Examiner*—Marshall M. Curtis
*Attorney, Agent, or Firm*—Robert E. Burns; Emmanuel J. Lobato; Bruce L. Adams

[57] ABSTRACT

A driving circuit for an electrochromic display device in which electric charges for coloration in a colored segment group are transferred to a bleached segment group to change the display state by the application of a voltage between the colored segment group and the bleached segment group comprises an electric charge transfer control circuit for producing an electric charge transfer signal only when the display information displayed by the electrochromic display device is being changed, and an electric charge transfer-time control circuit for setting the electric charge transfer-time at a time more than the maximum transfer time required by the electrochromic display device both during low temperature operation and during electric charge transfer using the maximum number of segments for which electric charge transfer can be carried out by the electrochromic display device.

6 Claims, 14 Drawing Figures

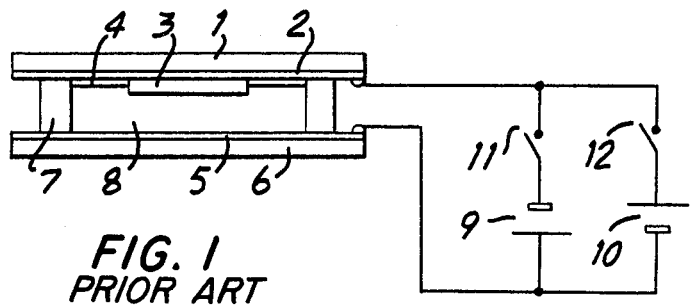
FIG. 1
PRIOR ART
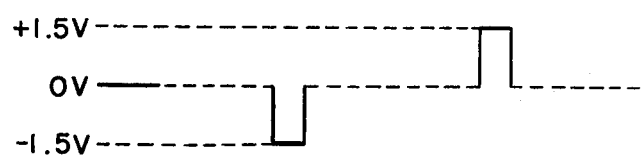
PRIOR ART FIG. 2A
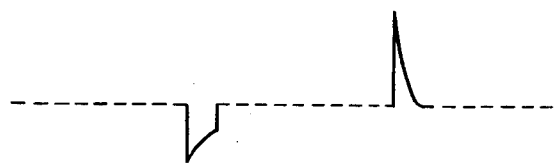
PRIOR ART FIG. 2B

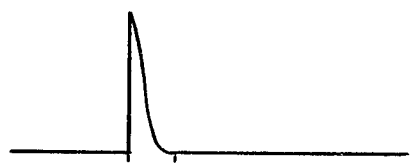
FIG. 4C
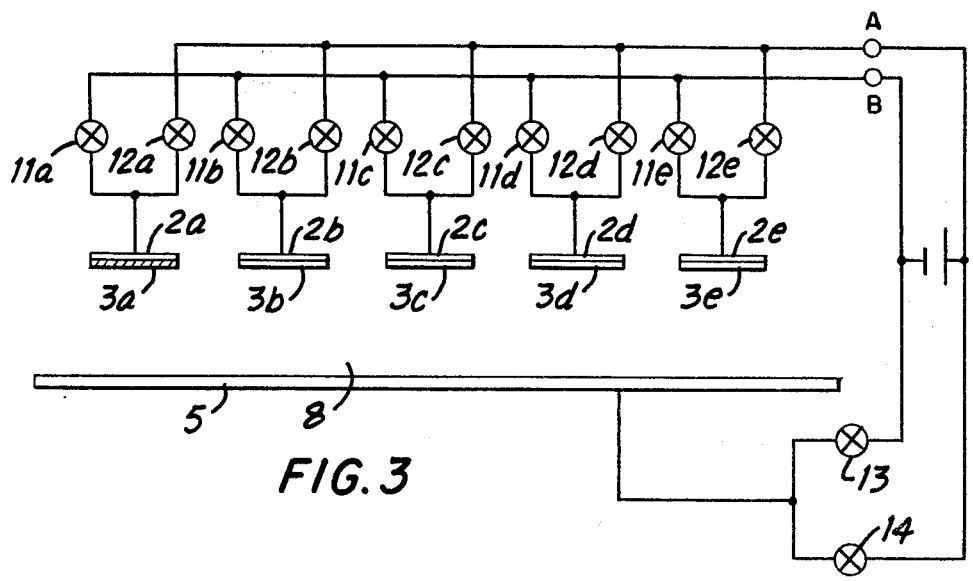
FIG. 3

ELECTROCHROMIC DISPLAY DEVICE EXHIBITING UNIFORM COLORATION DENSITY

BACKGROUND OF THE INVENTION

The present invention relates to a driving circuit for an electrochromic display device (referred to hereinafter as ECD), and more particularly, to a driving circuit for transferring electric charges for colouration from a coloured segment group to a bleached segment group (hereinafter referred to as "charge transfer driving") by the application of a voltage between the coloured segment group and the bleached segment group of the ECD.

In the prior art, the colouration/bleaching operation in an ECD is attained by the change of polarity of a voltage pulse applied between a display electrode and a counter electrode. A sectional view of the conventional ECD and a voltage waveform for driving the ECD are illustrated in FIG. 1 and FIG. 2.

In FIG. 1, a display electrode 2 which is a transparent thin film mainly consisting of $In_2O_3$ or $SnO_2$ is arranged on a transparent glass substrate 1, and an EC layer 3 which is a thin film mainly consisting of $WO_3$ or $MoO_3$ is formed on the display electrode 2.

An insulating layer 4 can be formed by evaporating $Al_2O_3$ or the like. A counter electrode 5 is formed by evaporating Au-Cr on a glass substrate. A spacer 7 adheres to the circumferences of the transparent glass substrate and the glass substrate, and an electrolyte is sealed within the spacer.

A negative electrode of a battery 9 is connected to the display electrode 2 and a positive electrode thereof is connected to the counter electrode 5. A positive electrode of a battery 10 is connected to the transparent electrode 2 and a negative electrode of the battery 10 is connected to the counter electrode 5. Moreover, switches 11 and 12 are arranged to each battery.

According to the above-mentioned circuit construction, when the switch 11 is turned on, a negative voltage pulse is applied to the display electrode 2 to colour the EC layer 3. The condition of colouration thereof is maintained even if the switch 11 is turned off. That is, the device has a memory function.

When the switch 12 is closed, a positive voltage pulse is applied to the display electrode 2 to bleach the EC layer 3.

FIG. 2A illustrates a voltage waveform described above which has a crest value of 1.5[V] in the positive direction and the negative direction, respectively. FIG. 2B illustrates a current waveform flowing through an ECD panel.

In general, a low power dissipation is required when the ECD is incorporated in small pocketable equipments such as an electronic wrist watch, an electric calculator and the like.

In this case, the reduction of the power dissipation is attained by the use of the display method, wherein the current for the change of state between colouration and bleaching is supplied to only the segment which is changed in its display state and the previous colouration/bleaching state is maintained for the segment group which is not changed in its display state by utilizing the memory function of the ECD.

However, in the conventional driving method, the density of colouration is reduced for many number of colored segments. Therefore, the difference between the density of coloration for a segment in the memory condition and that for a segment newly coloured is produced and a non-uniform density in colouration among the segments will occur. To eliminate the non-uniformity in colouration, there is a method in which a driving condition is changed depending on the number of the coloured segments, however, the circuit for realizing the method is more complex.

Since the driving condition depends on ambient temperature, a temperature compensation circuit is required. If the temperature compensating operation is not carried out, non-uniformity in the colouration of the segments will occur.

SUMMARY OF THE INVENTION

An object of the present invention is to eliminate the above mentioned drawbacks, and to provide a driving circuit in which the occurrence of the non-uniformity in the colouration of the segments can be removed by driving the ECD by a new driving method referred to as "a charge transfer method" and the circuit can be realized in a relatively simple circuit without a temperature compensating circuit.

Another object of the present invention is to provide a driving circuit for an electrochromic display device in which electric charges for colouration in a coloured segment group are transferred to a bleached segment group to change the display state by the application of a voltage between the coloured segment group and the bleached segment group of the electrochromic display device, the driving circuit comprising an electric charge transfer control circuit for producing an electric charge transfer signal only when a display information is changed, and an electric charge transfer-time control circuit for controlling the electric charge transfer-time.

BRIEF DESCRIPTION OF DRAWINGS

The nature, objects and advantages of the invention will be more fully understood from the following description of a preferred embodiment of the invention which will be more fully understood from the following description of a preferred embodiment of the invention shown by way of example in the accompanying drawing in which:

FIG. 1 is a sectional view of a conventional ECD panel.

FIG. 2A and FIG. 2B illustrate waveforms of the conventional ECD driving signal.

FIG. 3 illustrates a circuit diagram to aid in an understanding of the basic operation of an electric charge transfer system.

FIG. 4A, FIG. 4B and FIG. 4C illustrate voltage/current waveforms for the electric charge transfer.

DESCRIPTION OF PREFERRED EMBODIMENT

Figure 4A:
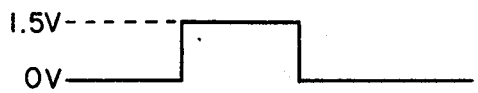

FIG. 3 is a schematic illustration of an ECD for explaining the basic operation of the charge transfer method according to the present invention.

In FIG. 3, the same parts as that of FIG. 1 are designated by the same references as that of FIG. 1 and the description therefore will be omitted. To prevent the figure from becoming complex, a glass substrate, a spacer and an insulating layer which are unnecessary for an understanding of the invention have been, omitted from the figure. 3a to 3e inclusive are EC layers. 2a to 2e inclusive are transparent display electrodes. Switches for colouration designated by reference numerals 11a through 11e are connected to a terminal B and switches for bleaching designated by reference numerals 12a through 12e are connected to a terminal A. The positive terminal of a battery is connected to the terminal A and the negative terminal of the battery is connected to the terminal B.

The counter terminal 5 is connected to the negative terminal of the battery through a switch 13, and to the positive terminal of the battery through a switch 14.

The operation of the ECD constructed as described above will be described.

At first, electric charges for colouration, to be transferred, are injected into the ECD panel. Assuming that a segment to which electric charge is injected is the segment 3a, when the switch 11a and the switch 14 are closed, electric charge is injected into the segment 3a to colour the segment 3a. After the segment 3a is coloured in a predetermined density, to memorize the display state, the switch 11a and the switch 14 are opened.

Next, the manner by which electric charge transfer occurs will be explained.

When the electric charge by which the segment 3a is coloured is transferred to the segment 3d, the switch 12a and the switch 11d are closed to connect the positive terminal of the battery to the display electrode 2a and to connect the negative terminal of the battery to the display electrode 2d. At this time, the electric charge for colouration is emitted from the segment 3a and is injected into the segment 3d through the electrolyte 8.

Figure 4B:

As a result, the segment 3a changes its colour condition from the coloured state to the bleached state and the segment 3d is coloured to thereby change the display content. FIG. 4 shows voltage waveforms and a current waveform for the electric charge transfer driving. The voltage waveform in FIG. 4A is applied to the display electrode 2a and the voltage waveform in FIG. 4B is applied to the display electrode 2d. The current waveform in FIG. 4C is applied between the display electrode 2a and the display electrode 2d. The current required for transferring the electric charge per one segment flows for 0.3[sec] and no current flows even if the voltage is impressed for more than 0.3[sec].

According to our experiment, it is confirmed that the amount of transfer electric charge obtained by integrating the current waveform is equal to the amount of the electric charge for colouration initially injected into the segment 3a. This shows that only the electric charge initially injected is transferred among the segments and no electric charge injection from the outside of the ECD panel and no taking out of electric charge to the outside thereof occurs when the electric charge is transferred.

Therefore, if each segment area is designed so as to be equal to each other, the density of the electric charge for colouration is kept at a predetermined value so that the density of colouration becomes constant.

Figure 5:
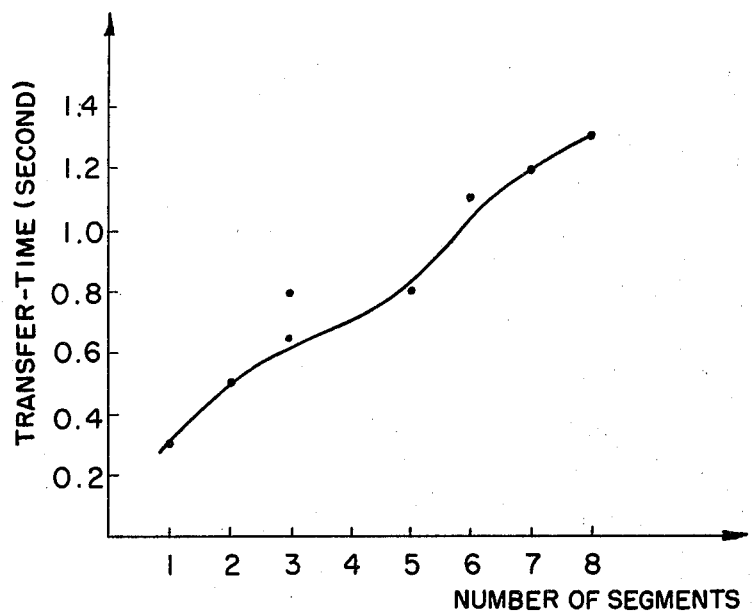
FIG. 5 illustrates a graph in which a relationship between the electric charge transfer-time and the number of segments.

Although the above description is made for the case wherein the number of the segments to which the charge is to be transferred is one, practically, the case in which the electric charge should be transferred to more than two segments at the same time will likewise occur. FIG. 5 illustrates experimental data showing the relationship between the number of segments and the transfer-time.

The axis of abscissa represents the number of segments and the axis of ordinate represents the transfer-time. The figure shows that the transfer-time is increased with an increase in the number of segments. In the conventional method, this causes the non-uniformity in the colouration density. However, according to the electric charge transfer method of the present invention, since only a predetermined amount of the electric discharge for colouration is transferred, the density of colouration will be maintained at the predetermined value even if the voltage is impressed to the panel after the transfer operation has finished. Therefore, if the transfer-time is controlled in such a way that the transfer-time is more than the maximum transfer-time decided by the maximum number of the segments to which electric charge for colouration is transferred, the occurrence of non-uniformity in the density of colouration can be easily prevented.

Although the transfer-time also depends on the temperature, in this case, if the transfer-time is controlled in such a way that the transfer-time is more than the maximum transfer time considering not only the maximum number of the segments but also the low temperature characteristic, the occurrence of non-uniformity in the density of colouration can be easily prevented without need of temperature compensation.

Figure 6:
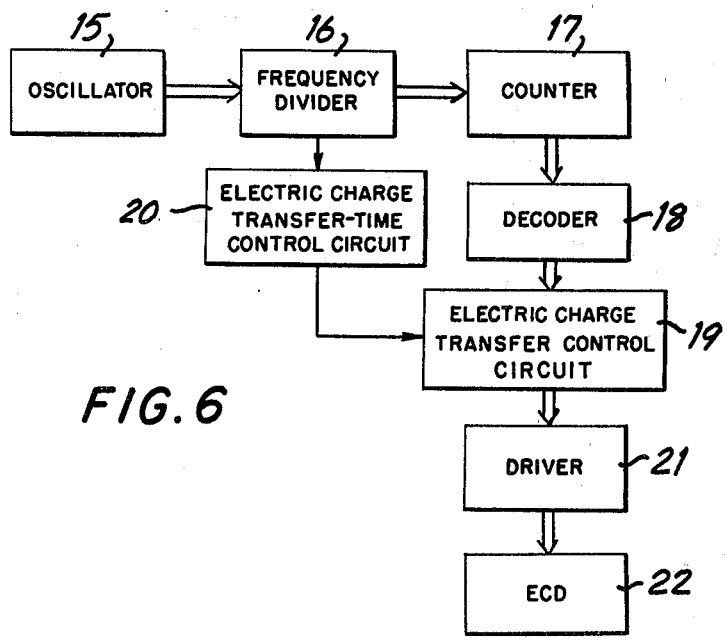
FIG. 6 is a block diagram of an electric charge transfer driving circuit according to the present invention.

FIG. 6 is a block diagram of a driving circuit for an ECD of the present invention. An electronic wrist watch is shown as one example of the system.

A reference numeral 15 designates an oscillator using a crystal which produces a time base signal. The time base signal is applied to a frequency divider 16 to divide the signal into the proper time signal, and after this, the signal from the divider 16 is applied to a counter 17. The count signals from the counter 17, such as a seconds-signal, a minutes-signal, an hours-signal, a days-signal, and a months-signal, are applied to an electric charge transfer control circuit 19 through a decoder 18.

The electric charge transfer control circuit 19 produces an electric charge transfer control signal having a constant pulse width in synchronization with the timing of the change of the display information produced from the decoder 18. The pulse width of the electric charge transfer control signal is set by an electric charge transfer-time control circuit 20.

The electric charge transfer control signal from the electric charge transfer control circuit 19 is applied to a driver 21 and the display operation in an ECD 22 is carried out by the use of an output signal from the driver 21.

Figure 7:
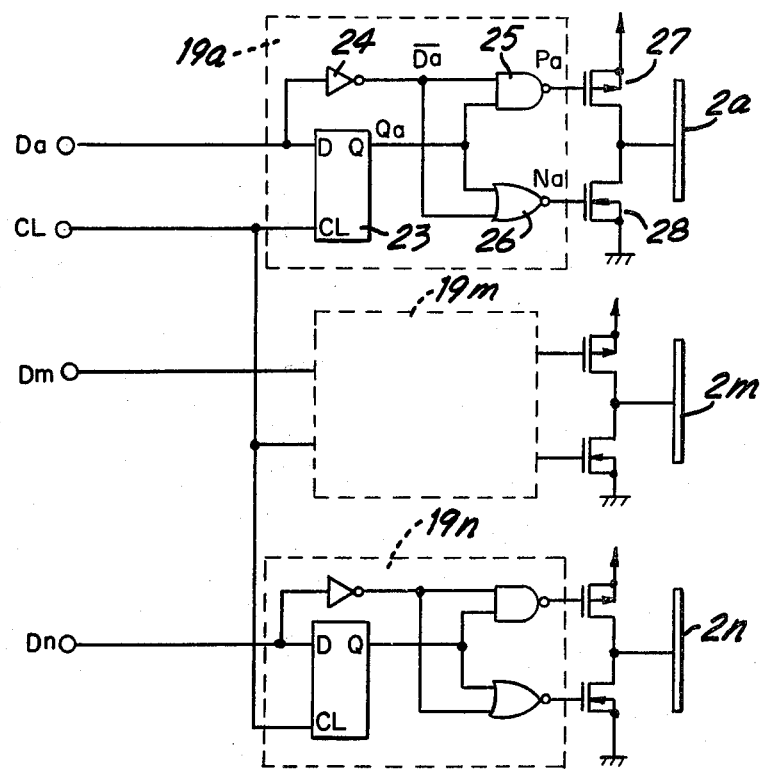
FIG. 7 illustrates one embodiment of an electric charge transfer driving circuit according to the present invention.

FIG. 7 shows one embodiment of the electric charge transfer control circuit 19 of the present invention. The electric charge transfer control circuits are designated by the reference numerals 19a to 19n and enclosed by dashed lines in FIG. 7. As the circuit constructions are the same among these circuits, only the circuit 19a will be explained.

Terminals Da through Dn are connected to output terminals of the decoder 18. The terminal Da is connected to a data input terminal of a D type flip-flop 23 and to an input terminal of an inverter 24. One input terminal of a NAND gate 25 is connected to an output terminal of the inverter 24 and the other terminal of the NAND gate 25 is connected to an output terminal Q of the D type flip-flop 23.

One input terminal of a NOR gate 26 is connected to the output terminal of the inverter 24 and the other terminal thereof is connected to the output terminal Q of the D type flip-flop 23.

An output terminal of the NAND gate 25 is connected to a gate of a P channel MOS FET 27. An output terminal of the NOR gate 26 is connected to a gate of an N channel MOS FET 28. A source electrode of the P channel MOS FET 27 is connected to the positive terminal of the battery and a drain electrode thereof is connected to the display electrode 2a.

A source electrode of the N channel MOS FET 28 is connected to the negative electrode of the battery and a drain electrode thereof is connected to the display electrode 2a. The driving circuit consists of the P channel MOS FET 27 and the N channel MOS FET 28. A clock input terminal CL of the D type flip-flop 23 is connected to an output terminal of the electric charge transfer-time control circuit 20.

Figure 8:
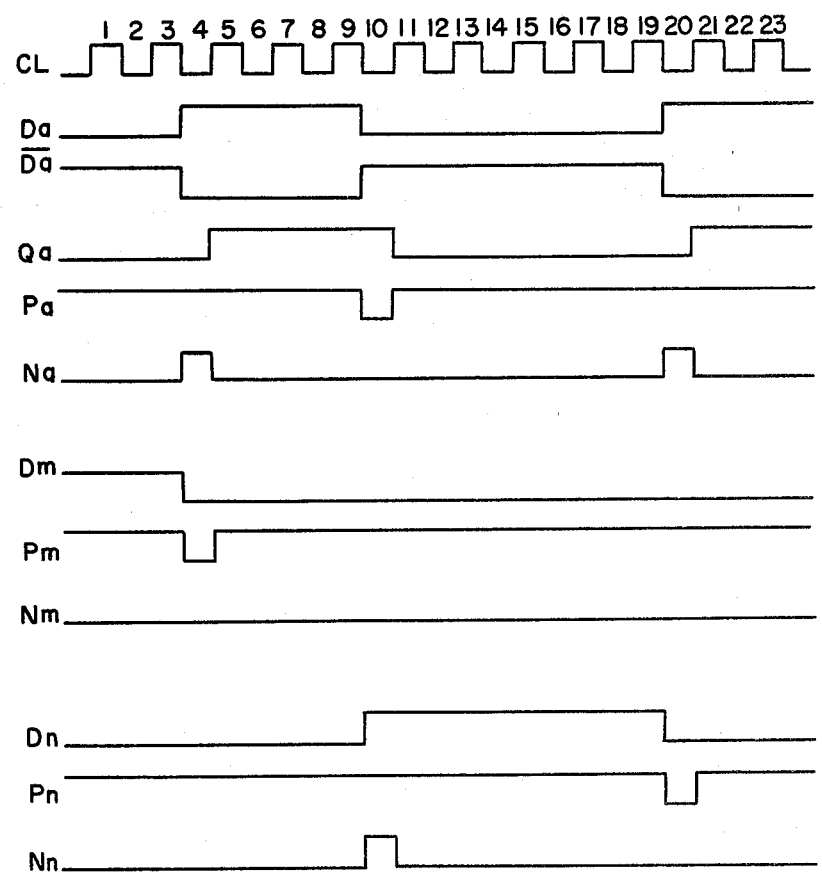
FIG. 8 illustrate a timing chart for the circuit shown in FIG. 7.

Now, the operation of the electric charge transfer control circuit will be described in conjunction with the timing charts shown in FIG. 8.

A signal Qa appears on the output terminal of the D type flip-flop 23, when the display information signal Da from the decoder 18 is applied to the data input terminal of the D type flip-flop 23 and the transfer-time control signal from the electric charge transfer-time control circuit 20 is applied to the clock input terminal.

The signal Qa corresponds to the display information signal Da delayed by a half of a period of the transfer-time control signal. That is, the signal Qa is a signal delayed by a half period of the clock signal applied to the D type flip-flop 23. When the output signal Qa from the D type flip-flop 23 and an inverted signal $\overline{Da}$ of the display information signal are applied to the NAND gate 25, a signal Pa appears on the output terminal thereof. When these signals Qa and $\overline{Da}$ are applied to the NOR gate 26, a signal Na appears on the output terminal thereof.

The signal Pa is a signal whose logical level becomes "L" for a half of period of the transfer-time control signal in synchronization with the time of the trailing edge of the display information signal Da.

The electric charge transfer control signal consists of the signal Na and the signal Pa. The N channel MOS FET 28 is turned on when the logical level of the signal Na is "H", and at this time, the display electrode 2a becomes an electrode to which the electric charge for colouration is injected.

The P channel MOS FET 27 is turned on when the logical level of the signal Pa is "L", and at this time, the display electrode 2a becomes an electrode from which the electric charge for colouration is emitted.

According to the above described driving method, the electric charge transfer operation is carried out only for the segment group which changes in a display state and the display information is kept by the memory function of the EC display element in another segment group. Therefore, the dissipation energy required for the change of display state can be made minimum.

The same operation is also carried out in the other electric charge transfer control circuits 19m and 19n. The movement of electric charge for colouration among the display electrodes 2a, 2m and 2n is shown in a table 1 according to the timing charts shown in FIG. 8.

TABLE 1

| clock timing | display electrode | | |
|---|---|---|---|
| | 2a | 2m | 2n |
| 4 | O ← | X | |
| 10 | X | | → O |
| 20 | O ← | | X |

In the table 1, the mark "O" indicates the injection of electric charge, and the mark "X" indicates the emission of electric charge. The arrow mark indicates the direction of electric charge transfer.

Though the above description has been stated for the case that the number of segments to be transferred is one, the above description is adaptable to the case that the number of segments to be transferred is more than one.

According to the above described driving system, the electric charge transfer-time can be easily decided by the electric charge transfer-time control circuit.

One embodiment of driving circuit according to the present invention, the time of a half period of the electric charge transfer-time control signal, which is an output signal from the electric charge transfer-time control circuit 20, is selected to be a time more than the maximum transfer-time in the case of a low temperature and the maximum number of the segments for which the electric charge transfer operation is to be carried out.

Figure 9:
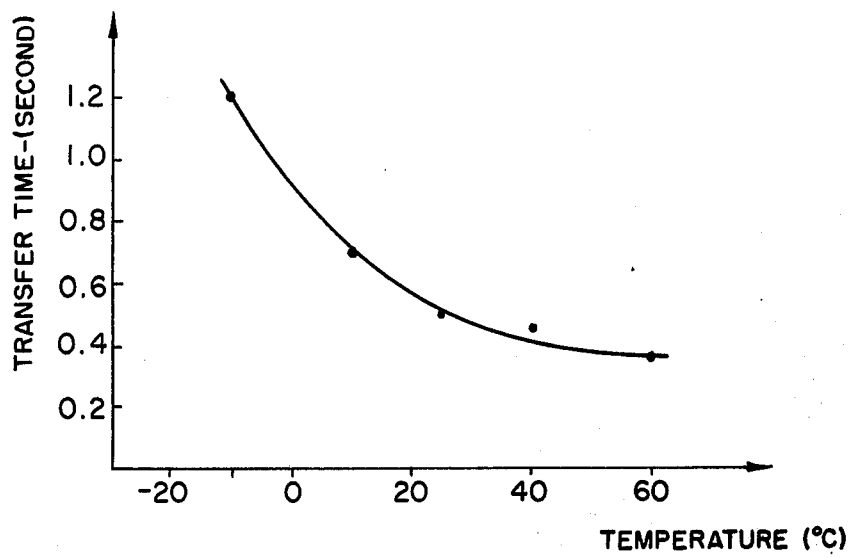
FIG. 9 illustrate a temperature characteristic for electric charge transfer-time.

FIG. 9 shows a temperature characteristic for an electric charge transfer-time.

In another embodiment of driving circuit according to the present invention, the least significant standard signal for display is used as the electric charge transfer-time control signal. For example, in an electric wrist watch display which displays "hours" and "minutes", the least significant digit is a "one minute position" and, therefore, a one minute signal is used as the electric charge transfer-time control signal.

Figure 10:
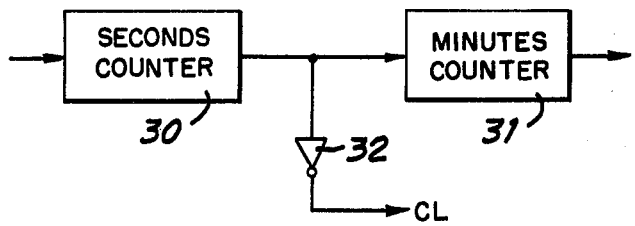
FIG. 10 illustrates one embodiment of an electric charge transfer-time control circuit.

A circuit construction for the electric charge transfer-time control circuit 20 in this case is illustrated in FIG. 10. In FIG. 10, 30 is a seconds-counter and 31 is a minutes-counter. 32 is an inverter acting as an electric charge transfer-time control circuit. The carry signal transferred from the seconds-counter 30 to the minutes-counter 31, is applied to an input terminal of the inverter 32.

Figure 11:
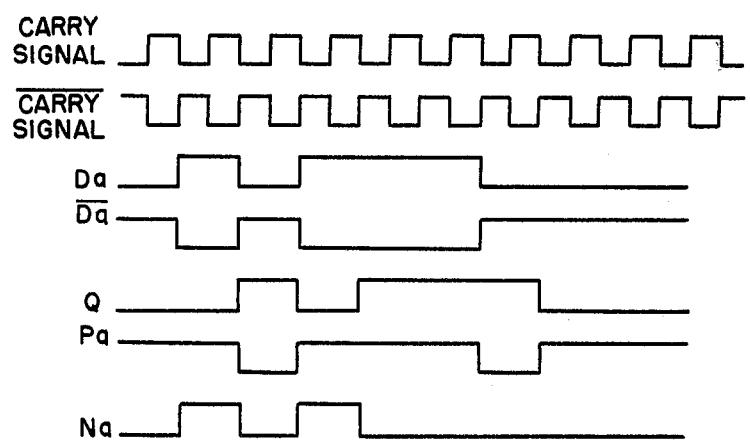
FIG. 11 illustrates a timing chart for one embodiment of the electric charge transfer-time control circuit.

Timing charts in which the electric charge transfer-time control circuit is arranged by the use of the inverter 32 are shown in FIG. 11. As described above, according to the present invention the electric charge transfer-time can be set at a time which is more than the maximum transfer-time by employing the simple circuit.

According to the present invention, the following features are achieved:

(1) An uniformity in colouration for display, involving that due to temperature characteristic, can be easily removed by employing a new ECD driving system, the "so-called electric charge transfer driving system", in which electric charge transfer-time is set to be more than the maximum transfer-time for the maximum number of the transfer segments under low temperature. Therefore, a temperature compensating circuit is not required.

(2) Since the electric charge transfer control circuit is arranged in such a way that the signal for transferring electric charge is produced only when the display information is changed, the memory function of the EC can be fully utilized. Therefore, the power dissipation in the ECD can be reduced.

As described above, it is possible to provide a driving circuit for ECD in which a power dissipation is small and a quality of the display state is high.

What is claimed is:

1. A driving circuit for an electrochromic display device in which electric charges for colouration in a coloured segment group are transferred to a bleached segment group to change the display state by the application of a voltage between the coloured segment group and the bleached segment group of the electrochromic display device, comprising: electric charge transfer control circuit means for producing an electric charge transfer signal only when the display information displayed by the electrochromic display device is being changed; and electric charge transfer-time control circuit means for controlling the electric charge transfer time and setting the time at more than the maximum transfer time required by the electrochromic display device both during low temperature operation and during electric charge transfer using the maximum number of segments for which electric charge transfer can be carried out by the electrochromic display device.

2. A driving circuit for an electrochromic display device as claimed in claim 1; wherein said electric charge transfer-time control circuit means sets the electric charge transfer-time so as to be equal to the display information change time.

3. In an electrochromic display device having a plurality of display segments having bleached and colored states and operable when a voltage is applied between a group of colored segments and a group of bleached segments to transfer electric charges through an electrolyte from the colored segment group to the bleached segment group to thereby change the display state of the electrochromic display device: electric charge transfer control means for producing electric charge transfer control signals for controlling the transfer of electric charges from a colored segment group to a bleached segment group; and electric charge transfer-time control means coacting with the electric charge transfer control means for controlling the time duration of the electric charge transfer control signals to thereby determine the transfer time during which electric charges can be transferred, said means maintaining the time duration of the electric charge transfer control signals at a predetermined time which is longer than the maximum transfer time required when electric charges are transferred between the maximum number of display segments able to be carried out by the electrochromic display device.

4. An electrochromic display device according to claim 3; wherein the electric charge transfer-time control means maintains the time duration of the electric charge transfer control signals at a predetermined time which is longer than the maximum transfer time required by the electrochromic display device throughout its range of operating temperatures thereby obtaining uniform coloration density throughout the operating temperature range without need of temperature compensating circuitry.

5. An electrochromic display device according to either claim 6 or claim 7; wherein the predetermined time is equal to the time it takes the electrochromic display device to change display states.

6. An electrochromic display device according to either claim 3 or claim 4; further comprising in combination therewith an electronic timepiece having means for producing time signals representative of units of time; and means including the electrochromic display device for periodically changing the display state to display information representative of time in response to the time signals.

* * * * *